(12) United States Patent
Cabezas et al.

(10) Patent No.: US 6,980,947 B2
(45) Date of Patent: Dec. 27, 2005

(54) UNIFIED DIAGNOSTICS PLATFORM SYSTEM AND METHOD FOR EVALUATING COMPUTER PRODUCTS

(75) Inventors: Rafael G. Cabezas, Austin, TX (US); Daniel J. Knabenbauer, Reseda, CA (US)

(73) Assignee: International Business Machines Corporation, Armonk, NY (US)

( * ) Notice: Subject to any disclaimer, the term of this patent is extended or adjusted under 35 U.S.C. 154(b) by 851 days.

(21) Appl. No.: 09/903,946

(22) Filed: Jul. 12, 2001

(65) Prior Publication Data

US 2003/0014618 A1    Jan. 16, 2003

(51) Int. Cl.[7] .......................... G06F 15/00; G06F 11/30
(52) U.S. Cl. .......................... 703/22; 703/24; 702/183; 702/186
(58) Field of Search .............................. 703/14, 22, 24; 370/244; 174/53; 702/183, 186

(56) References Cited

U.S. PATENT DOCUMENTS

| | | | |
|---|---|---|---|
| 4,165,443 A | * | 8/1979 | Figart et al. .................. 174/53 |
| 4,837,764 A | * | 6/1989 | Russello ....................... 714/46 |
| 4,964,124 A | * | 10/1990 | Burnett ......................... 714/44 |
| 5,684,789 A | * | 11/1997 | Habeck et al. .............. 370/244 |

OTHER PUBLICATIONS

"Engineering Approach to Digital Design" by William I. Fletcher, Prentice-Hall, Inc., 1980, pp. 210-213 and 231-235.*

* cited by examiner

*Primary Examiner*—Paul L. Rodriguez
*Assistant Examiner*—Dwin M. Craig
(74) *Attorney, Agent, or Firm*—Herman Rodriguez; Edmond A. DeFrank

(57) ABSTRACT

An evaluation system and method for computer products that uses a unified diagnostics platform having a switching multiplexor to generate a plurality of computer systems and computer environments. The evaluation system of the present invention includes a unified diagnostics platform that facilitates a variety of different computer systems by connecting computer peripherals, processors and operating systems. The switching multiplexor may be a plurality of switches allowing multiple combinations and configurations of devices connected to the unified diagnostics platform. The switching multiplexor is controlled using a controller that may be a hardware or a software selector. The evaluation method of the present invention includes a method for evaluating a computer product on a plurality of computer systems using the unified diagnostics platform.

17 Claims, 5 Drawing Sheets

UNIFIED DIAGNOSTICS PLATFORM SYSTEM AND METHOD FOR EVALUATING COMPUTER PRODUCTS

BACKGROUND OF THE INVENTION

1. Field of the Invention

The present invention relates in general to computers and more particularly to a computer evaluation system and method for evaluating computer products on a plurality of computer systems.

2. Related Art

Computers are widespread and vitally important to many types of enterprises including businesses, universities and government as well as for home and personal use. As demand continues to grow for computers, a wide variety of hardware computer products are constantly being developed. Before these newly developed computer products can be offered for sale, it is essential that they be evaluated on a variety of computer systems. This evaluation ensures that the new computer products are compatible and reliable with existing computer hardware and operating systems.

In order to perform this evaluation, computer manufacturers typically have large testing facilities used to evaluate new computer products. These testing facilities usually include multiple computer systems that are self-contained. Each self-contained computer system includes its own central processing unit (CPU) and computer peripherals (such as a monitor, a keyboard, a mouse, and a hard drive).

One problem with these types of testing facilities is that the computer peripherals are duplicated between computer systems. Thus, the testing facilities may contain several identical or similar monitors, keyboards and hard drives. This tends to make the testing facilities large and expensive because of the space and expense required to acquire, store and maintain multiple self-contained computer systems. In addition, the labor and maintenance costs of configuring the computer systems, installing and changing parts on all these computer systems, and the duplication of prototypes to test in different environments involves even greater expense.

Therefore what is needed is a computer evaluation system and method that eliminates redundant computer peripherals when evaluating new computer hardware products. What is also needed is a system and method for computer evaluation that requires a minimal amount of maintenance and avoids unnecessary duplication of computer peripherals. Moreover, what is further needed is an evaluation system and method that is efficient, low-cost and scalable to allow rapid evaluation of computer products with a wide variety of computer operating systems.

SUMMARY OF THE INVENTION

To overcome the limitations in the prior art as described above and other limitations that will become apparent upon reading and understanding the present specification, the present invention includes an evaluation system and method that uses a unified diagnostics platform to generate a desired computer system on which to evaluate a computer product. The unified diagnostics platform is capable of generating a variety of different computer system configurations by connecting a plurality of different computer devices. These devices include a computer processor, operating system and computer peripherals. In addition, the unified diagnostics platform eliminates the duplication of redundant computer peripherals.

Current testing facilities for evaluating computer products require multiple self-contained computer systems that have duplicate many computer peripherals. A large amount of time and cost is associated with building and maintaining these self-contained computer systems. The evaluation system and method of the present invention solves these problems by facilitating the use of a single set of computer peripherals thereby alleviating the duplication of redundant computer peripherals their associated space, time and expense requirements. Moreover, the evaluation system and method of the present invention is efficient, scalable and may be easily integrated into existing computer product evaluation environments as a low cost alternative.

The evaluation system of the present invention includes a unified diagnostics platform that is capable of generating a plurality of different computer systems and computer environments by connecting computer devices. A computer product is then evaluated on a desired computer system configuration. The unified diagnostics platform includes an external input system for connecting the computer devices and an external output system that allows connection of the computer product to be evaluated. The unified diagnostics platform also includes a switching multiplexor that provides connection between the computer devices and the computer product based on a selection. The switching multiplexor may be a plurality of switches allowing multiple combinations and configurations of computer processors, operating systems, computer peripherals and computer products to be evaluated. A controller in communication with the switching multiplexor provides selection control as to which combination and configuration of computer devices connected to the unified diagnostics platform are selected. The controller may be a hardware or a software selector and may be a physical control that requires human intervention or may be computer controlled.

The evaluation method of the present invention includes a method for evaluating a computer product on a plurality of computer systems using the unified diagnostics platform. This method includes providing a unified diagnostics platform to generate a desired computer system and evaluating a computer product on the computer system Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not by the preceding summary or the following detailed description.

BRIEF DESCRIPTION OF THE DRAWINGS

The present invention can be further understood by reference to the following description and attached drawings that illustrate the preferred embodiments. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

Figure 1:
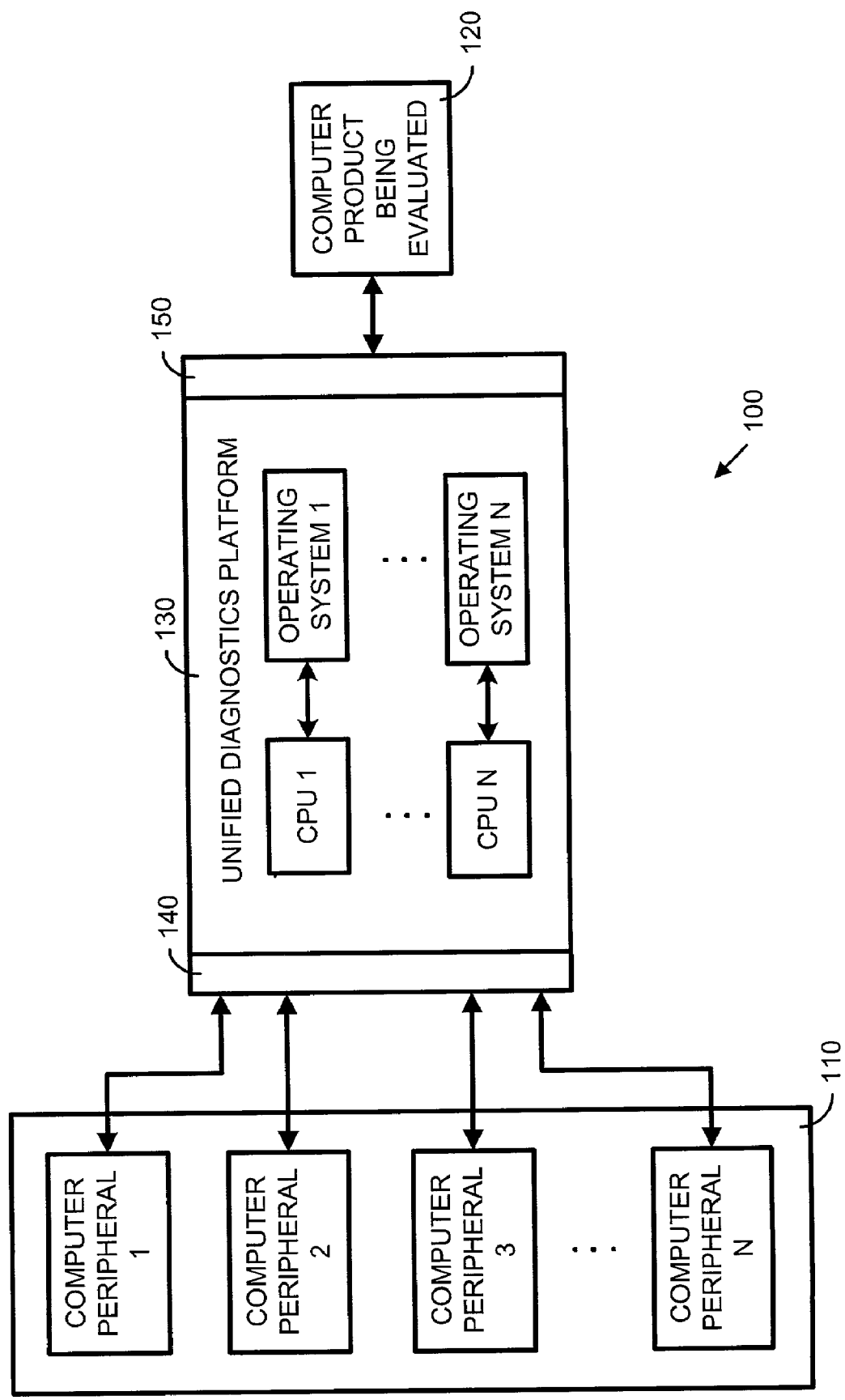
FIG. 1 illustrates an evaluation system incorporating the present invention and is shown for illustrative purposes only.

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction

Current techniques for evaluating compatibility of a computer hardware products with other computer hardware and operating systems are expensive, time consuming and require a large number of self-contained computer systems. As an ever-increasing number computer systems and operating systems are developed, the expense associated with these current evaluation techniques increases. The computer evaluation system and method of the present invention eliminates much of the expense associated with evaluation by eliminating the duplication of computer peripherals associated with computer systems. In particular, evaluation system and method of the present invention facilitates the use of computer peripherals on different computer systems thereby alleviating the duplication of computer peripherals and their associated space, time and expense requirements. Costs are lowered because new computer peripherals such as monitors and keyboards do not have to be purchased every time a new computer system is acquired. Instead, a new processor or operating system is installed in the unified diagnostics platform of the present invention and the desired computer peripherals are connected. The computer product to be evaluated is then connected to the configuration.

Generally, the present invention includes a system and a method for evaluating a computer product using a unified diagnostics platform to achieve a variety of computer system configurations without unnecessary duplication of computer peripherals. The unified diagnostics platform is a switching device that facilitates configuration of a number o different computer system. In particular, a central processing unit (CPU) and an operating system are installed on the unified diagnostics platform. Computer peripherals are connected to the unified diagnostics platform as well as the computer product being evaluated. The unified diagnostics platform is used to configure achieve a desired computer system configuration so that the computer product to be evaluated may be tested.

The unified diagnostics platform contains at least one switch to facilitate a selection of various combinations of the plurality of computer peripherals, CPUs and operating systems, thus allowing the evaluation of the computer product in a plurality of different computer environments. Thus, using the present invention evaluation of the computer product may be performed in a variety of computer environments easily, efficiently and inexpensively.

II. Overview of the Invention

In general, the unified diagnostics platform system includes a switching multiplexor that facilitates a desired computer system configuration by connecting a CPU, operating system and computer peripherals. This computer system is then used to evaluate a computer product. In this manner, the compatibility of the computer product with certain computer systems and in certain computer environments may be evaluated. The switching multiplexor facilitates multiple combinations and configurations of devices connected to the unified diagnostics platform.

FIG. 1 illustrates an evaluation system incorporating the present invention and is shown for illustrative purposes only. The evaluation system 100 includes a bank of computer peripherals 110 including computer peripheral 1, computer peripheral 2 and computer peripheral 3 up to and including computer peripheral N. The three dots shown in the computer peripheral bank 110 signify additional computers between computer peripheral 3 and computer peripheral N that are not shown. It should be noted that even though at least four computer peripherals are shown in the computer peripheral bank 110, more or less computer peripheral could be used.

The evaluation system 100 also includes a computer product 120 that is being evaluated. By way of example, this evaluation may include determining the compatibility of the computer product 120 with a variety of computer peripherals, processors or operating systems. A unified diagnostics platform 130 of the present invention provides a means to configure a computer system and computer environment in which the computer product 120 may be evaluated. In particular, the unified diagnostics platform 130 includes an external input system 140 that allows connection of the computer peripheral bank 110 to the unified diagnostics platform 130. Each one of the computer peripherals in the computer peripheral bank 110 is connected to the unified diagnostics platform 130 via the external input system 140. The unified diagnostics platform 130 includes an external output system 150 that allows connection of the computer product 120 to the unified diagnostics platform 130.

The unified diagnostics platform 130 includes a plurality of central processing units (CPUs), CPU 1 to CPU N and a plurality of associated operating system, operating system 1 to operating system N. Using the unified diagnostics platform 130, a variety of computer systems may be configured using the computer peripheral bank 110, the CPUs and the operating systems.

It should be noted that the external input system 140 is not limited to connecting a single computer product (such as the computer product 120) to the unified diagnostics platform 130. In particular, even though not shown in FIG. 1 (for the sake of simplicity), a plurality of computers products could be connected to the computers and associated computer components in the computer bank 110 in any combination thereof through the unified diagnostics platform 130 of the present invention. It should also be noted that the computer product 120 is not limited to being external to the unified diagnostics platform 130 or and may be incorporated into a container such as, for example, a computer platform.

Figure 2:
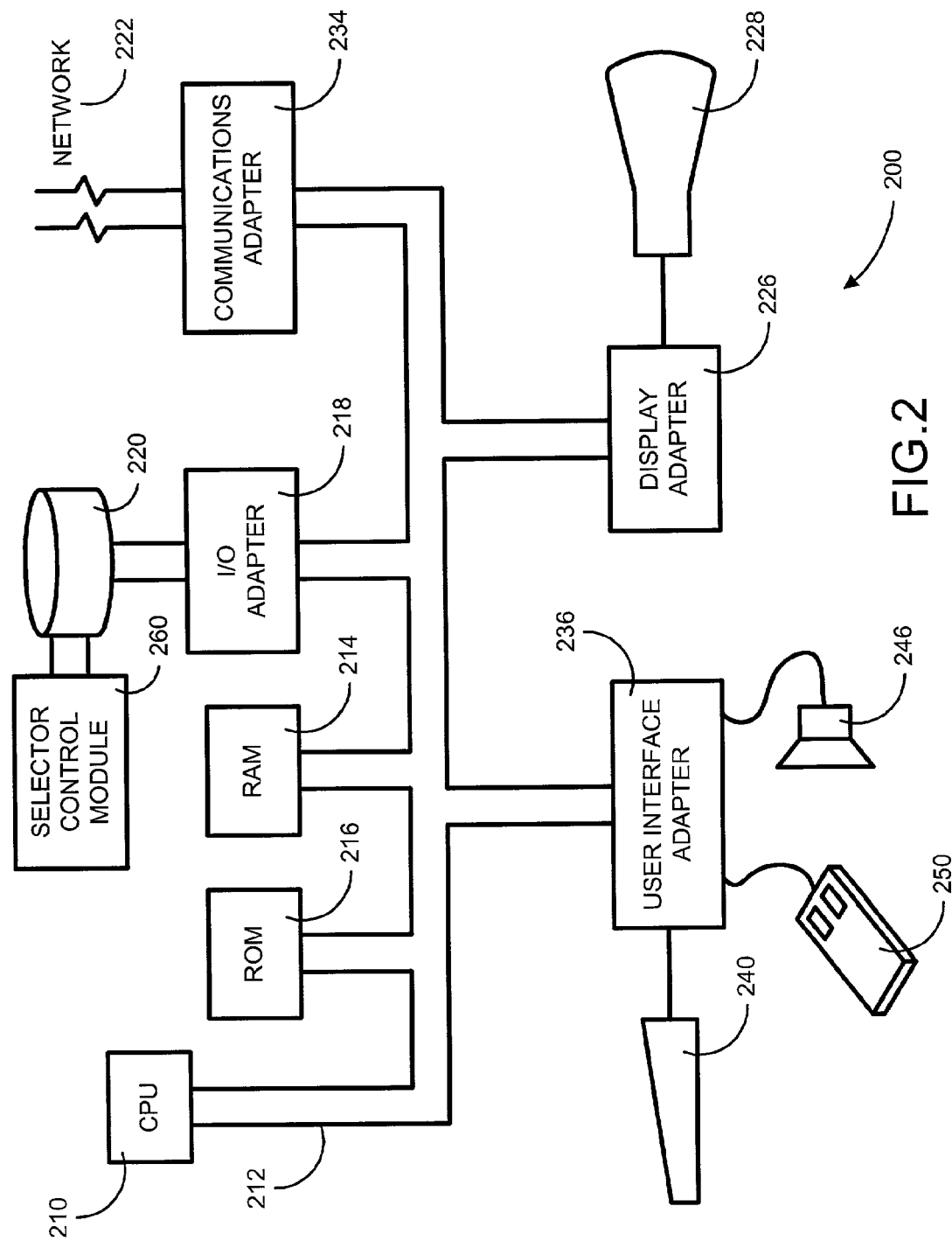
FIG. 2 is a block diagram of an individual computer system of FIG. 1 that may be used with the present invention.

FIG. 2 is a block diagram of an individual computer system of FIG. 1 that may be used with the present invention. Specifically, a computer system 200 may be one of the computer system configured by using the unified diagnostics platform 130 of FIG. 1. The computer system 200 includes any suitable central processing unit (CPU) 210, such as a standard microprocessor, and any number of other objects interconnected by a system bus 212. For purposes of illustration, the computer system 200 includes memory such as random-access memory (RAM) 214, read-only memory (ROM) 216, and storage devices (such as hard disk or disk drives 220) connected to the system bus 212 by an input/ output (I/O) adapter 218. The computer system 200 also may be a client machine that is capable of connecting and interacting with a server over a network 222.

The computer system 200 further includes a display adapter 226 for connecting the system bus 212 to a suitable display device 228. In addition, a user interface adapter 236 is capable of connecting the system bus 212 to other user interface devices, such as a keyboard 240, a speaker 246, a mouse 250 and a touchpad (not shown). In a preferred embodiment, a graphical user interface (GUI) and an operating system (OS) reside within a computer-readable media and contain device drivers that allow one or more users to manipulate object icons and text on the display device 228. Any suitable computer-readable media may retain the GUI and OS, such as, for example, the RAM 214, ROM 216, hard disk or disk drives 220 (such as magnetic diskette, magnetic tape, CD-ROM, optical disk or other suitable storage media).

As explained in detail below, the computer system 200 also may be included in the unified diagnostics platform 130 as a control computer. Accordingly, as shown in FIG. 2, the storage device 220 of the computer system 200 may contain a selector control module 260 for controlling the unified diagnostics platform 130 to configure a desired computer system using the computer peripheral bank 110, CPUs and operating systems. The selector control module 260 contains computer-executable instructions for carrying out the present invention.

III. Components of the Invention

Figure 3:
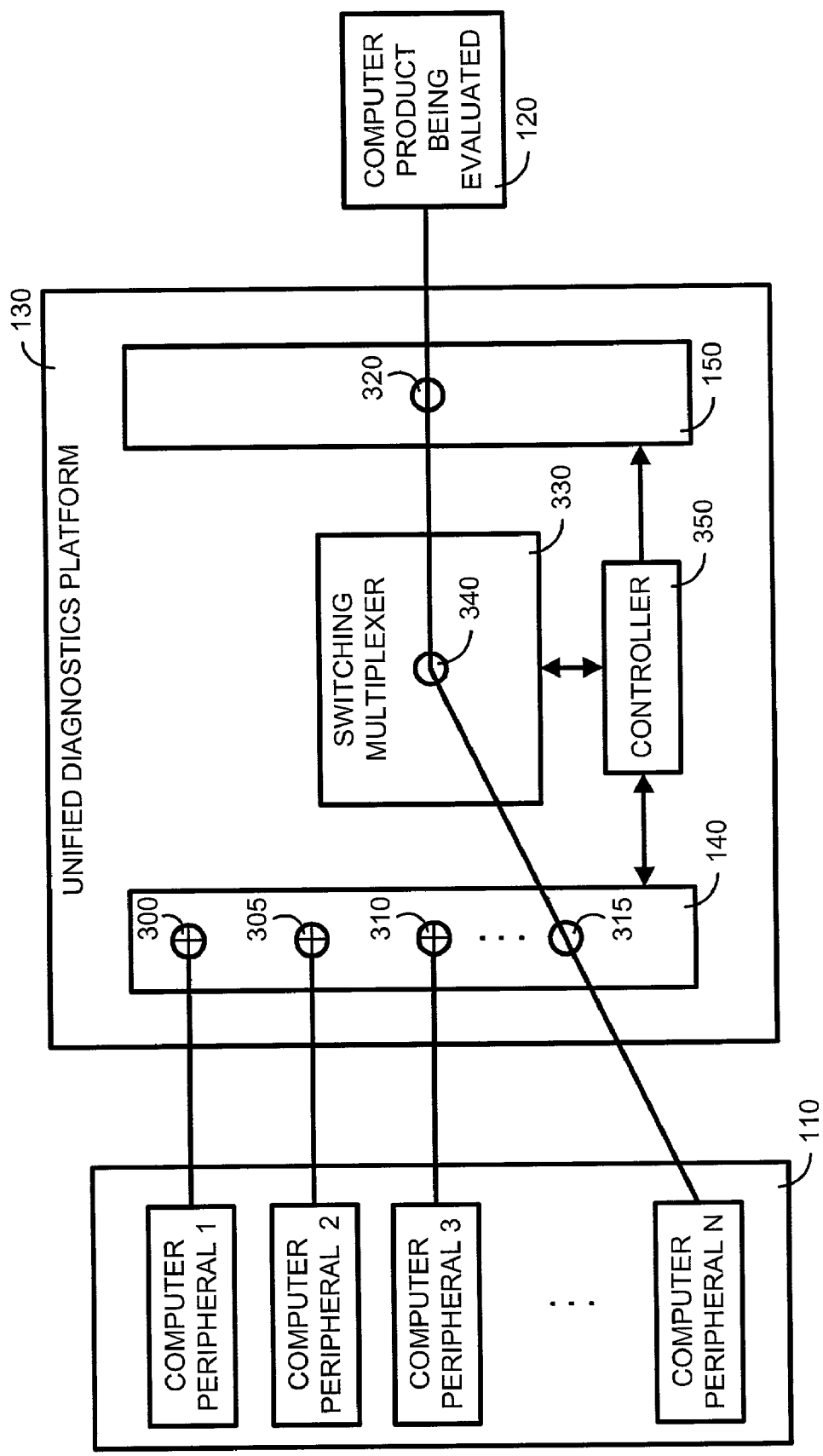
FIG. 3 is a general block diagram illustrating the components of the unified diagnostics platform shown in FIG. 1.

FIG. 3 is a general block diagram illustrating the components of the unified diagnostics platform 130 shown in FIG. 1. Referring to FIGS. 1 and 3, the external input system 140 includes inputs from each of the computers in the computer peripheral bank 110 and uses connectors to connect each of these computer peripherals to the unified diagnostics platform 130. Thus, computer peripheral 1 is connected to a first connector 300, computer peripheral 2 is connected to a second connector 305, computer peripheral 3 is connected to a third connector 310 and computer peripheral N is connected to an Nth connector 315. In a similar manner, the external output system 150 includes an output connector 320 that connects the computer product 120 to be tested to the unified diagnostics platform 130.

The unified diagnostics platform 130 includes a switching multiplexor 330 that includes a main connector 340 for connecting the computer peripherals in the computer peripheral bank 110 to a CPU and operating system (shown in FIG. 1) and the computer product 120. As explained in a working example below, the switching multiplexor 330 may includes multiple switches to enable multiple configurations of computer systems and computer environments. The unified diagnostics platform 130 also includes a controller 350 that controls the selection of which computer peripheral in the computer peripheral bank 110 is connected to the computer product 120. This controller 350 may be a hardware or a software selector and may be a physical control that requires human intervention or may be computer controlled. For example, the controller 350 could include the computer of FIG. 2 including the selector control module 260 for providing input control. In a preferred embodiment, the controller 350 is a software-controlled controller because software is generally more able to cope with the plethora of possible connections possible using the unified diagnostics platform of the present invention. Moreover, any conflicts that may exist are generally more easily resolved using a software controller. For example, it is unlikely that a keyboard would be allowed a connection to multiple operating computer platforms simultaneously by the controller 350. The controller 350 is also capable of controlling the output of the unified diagnostics platform 130 such that any one of a plurality of computer products to be tested may be connected a computer in the computer peripheral bank 110.

The connections of the external input system 140, the external output system 150 and the switching multiplexor 330 allow a multitude of possible computer system configurations to be connected to the computer product 120. Thus, as shown in FIG. 3, computer peripheral N is connected via the Nth connector 315, the main connector 340 and the output connector 320 to the computer product. In FIG. 3, the lines joining the connectors represent multiple connections per each computer. Thus, the lines joining computer N, the Nth connector 315, the main connector 340 and the output connector 320 represent multiple connections of computer peripheral such as, for example, a keyboard, a mouse, parallel and serial ports and USB ports. Because the switching multiplexor 330 multiplexes these inputs, the unified diagnostics platform 130 allows any component of computer peripheral N to be connected to the computer product 120. The number of inputs contained in the external input system 140 depends on the user's need and may be expanded as the user's need grows.

IV. Operation and Working Example

In general, the unified diagnostics platform method of the present invention includes a method for using a unified diagnostics platform to generate a desired computer system configuration and evaluate a computer product on the configuration. The unified diagnostics platform enables a computer system to be configured from a selection of processors, operating system and computer peripherals.

Figure 4:
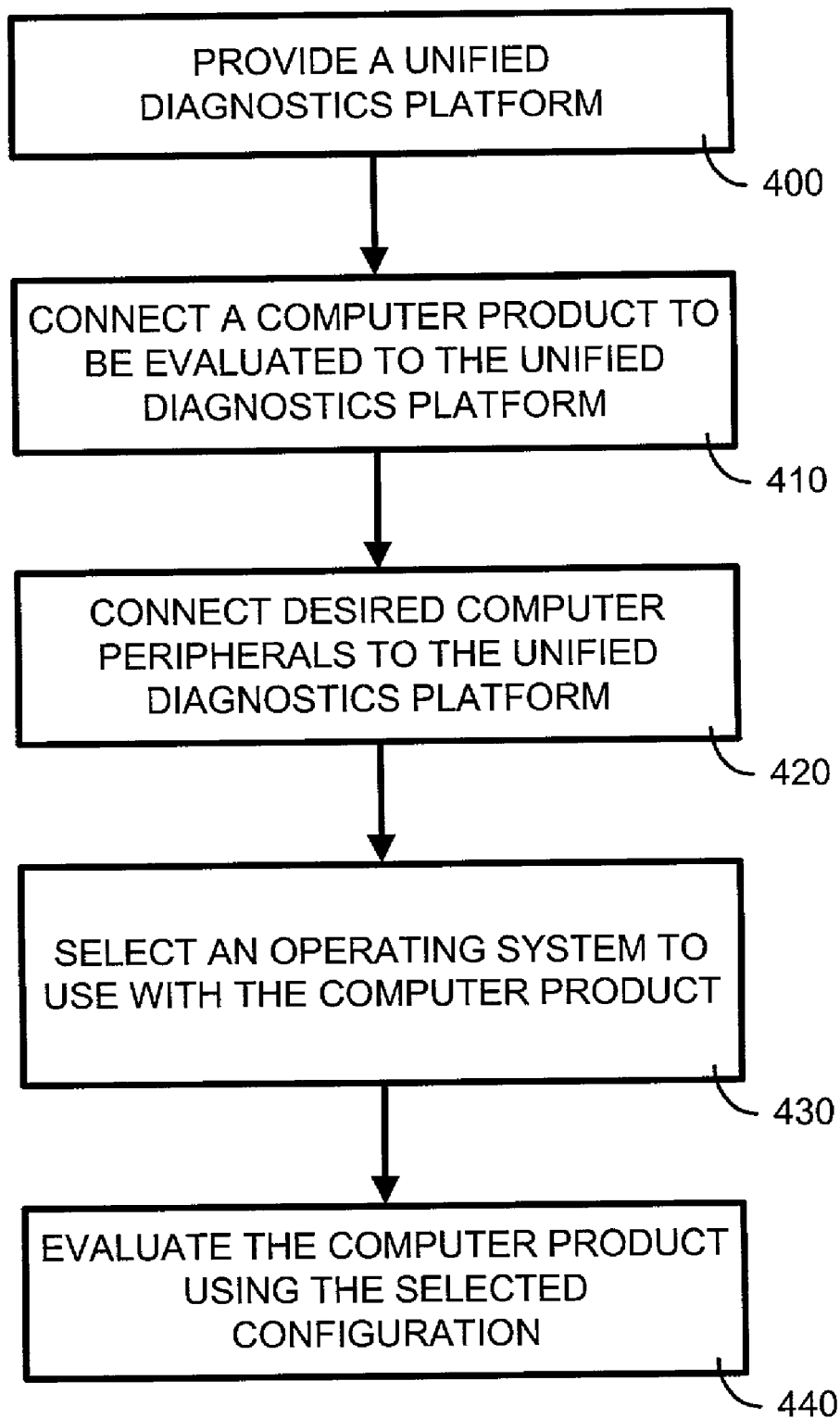
FIG. 4 is a general flow diagram illustrating the general operation of the present invention.

FIG. 4 is a general flow diagram illustrating the general operation of the present invention. In particular, a unified diagnostics platform is provided (box 400) and at least one computer product to be evaluated is connected to the unified diagnostics platform (box 410). Moreover, a plurality of computer peripherals are connected to the unified diagnostics platform (box 420). These computer peripherals may include a plurality of computer peripherals. If this is the case, then there are multiple connections to the unified diagnostics platform (such as, for example, one connection for a keyboard and one connection for a monitor). Next, an operating system is selected (box 430). Finally, the selected computer products are evaluated using the selected computer system configuration (box 440).

Figure 5:
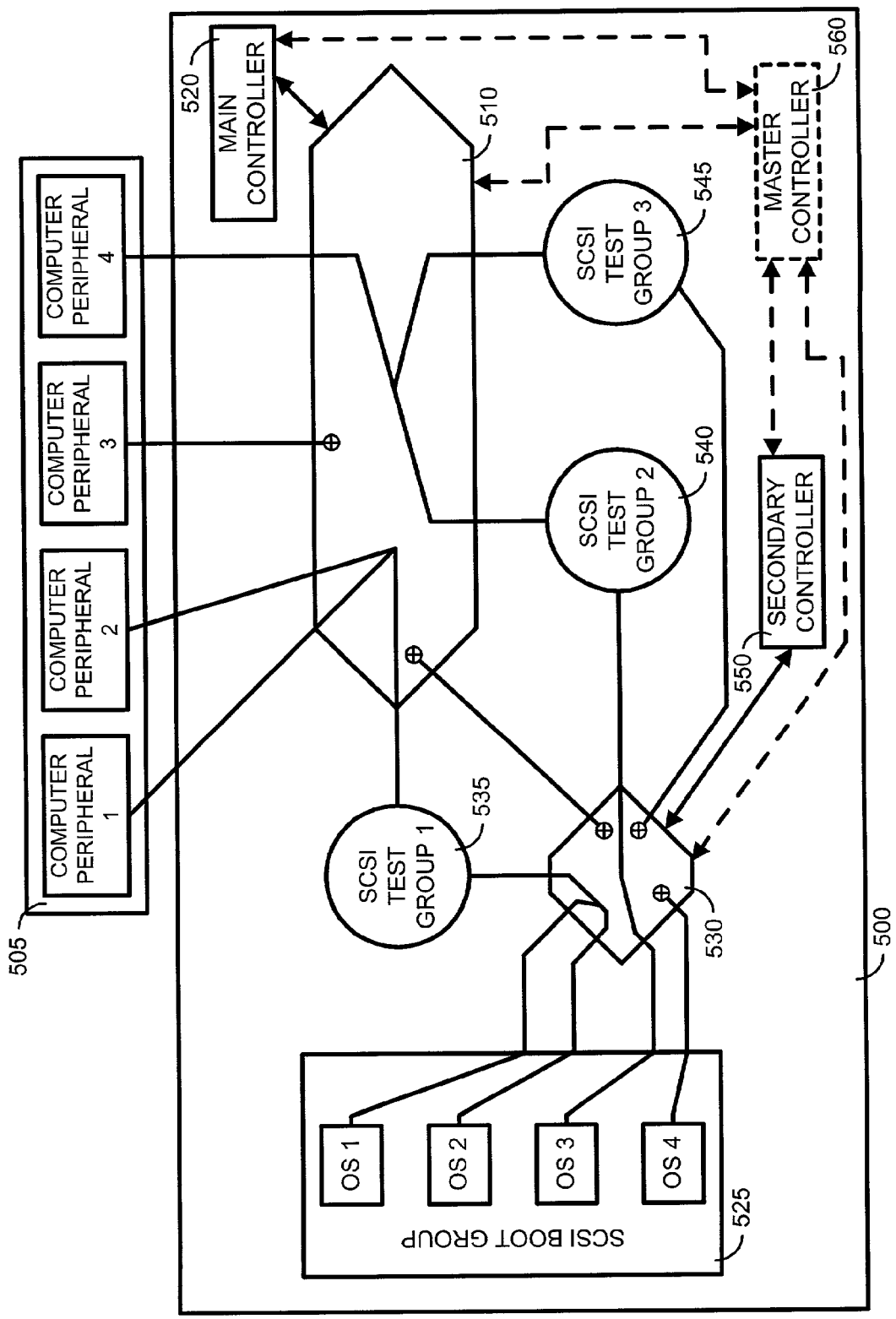
FIG. 5 is a detailed block diagram illustrating a working example of the present invention.

The following discussion is a working example illustrating an exemplary embodiment of the unified diagnostics platform of the present invention. This working example is a more complicated multiple-controller implementation of the unified diagnostics platform shown in FIG. 3. More specifically, FIG. 5 is a detailed block diagram illustrating a working example of the unified diagnostics platform 500 having additional switching complexity by using a plurality of controllers. In this working example, a bank of computer peripherals 505 (having four computer peripherals in this example) is connected to the unified diagnostics platform 500 through a main switch 510. In this working example, the main switch 510 is a multi-way, multi-function switch that provides complex connection of various CPUs, operating system and computer peripherals. A main controller 520 is used to determine which selections are made and, as described above, may be a hardware or a software selector and may be a physical control that requires human intervention or may be computer controlled.

The unified diagnostics platform 500 includes four different operating systems belonging to a SCSI boot group 525. In this working example of an alternative embodiment, the four different operating systems (OS 1, OS 2, OS 3 and OS 4) are contained on hard disks and each computer platform in the computer bank 505 may boot off of each operating system. A secondary switch 530 is used to connect the SCSI boot group 525 with the computer peripheral bank 505 and computer products to be tested that are contained in three test groups. In this embodiment, the test groups can be contained within the unified diagnostics platform 500 during testing as shown in FIG. 5. These test groups include a SCSI test group 1 535, a SCSI test group 2 540 and a SCSI test group 3 545, each of which is connected to the secondary switch 530. A secondary controller 550 determines which of the devices connected to the secondary switch 530 are connected to each other and, as described above, may be either a hardware or a software selector. In an optional embodiment (as shown by the dashed lines), a master controller 560 is used to control all other controls and switches (such as the main switch 510, the secondary switch 530, the main controller 520 and the secondary controller 550). In this optional embodiment, the master controller 560 is preferably software controlled.

The arrangement shown in FIG. 5 also enables the connection of multiple SCSI devices to more than one of the computer peripheral bank 505 at the same time. In a preferred embodiment, any devices stored internally to the unified diagnostics platform 500 are powered by the unified diagnostics platform's 500 own internal power supplies (not shown). Alternative embodiments are possible, such as, for example, providing an external power source for any devices connected to the unified diagnostics platform 500.

As can be seen from FIG. 5, the test groups 535, 540, 545 are connected to both the main switch 510 and the secondary switch to enable a plurality of selections and combinations. For example, as shown in FIG. 5, the main switch 510 and the secondary switch 530 are selected such that computer peripheral 1 is configured to boot from OS 2 and to evaluate the computer products of SCSI test group 1. Similarly, computer peripheral 2 is configured to boot from OS 1 and also to evaluate the computer products of SCSI test group 1. Computer peripheral 3 is configured such that it is self-sufficient, while computer peripheral 4 is configured to boot from OS 3 and to evaluate the computer products in both SCSI test group 2 and SCSI test group 3. In FIG. 5, OS 4 is configured such that it is not connected to the computer peripheral bank 505 or the SCSI test groups. Thus, it can be seen from FIG. 5 that many configurations of computer systems and computer environments are possible using the main switch 510 and the secondary switch 530 in combination. Moreover, it should be noted that additional switches may be added to further increase the combinations and possibilities.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. An evaluation system for evaluating a computer device on a plurality of computer systems, comprising using a unified diagnostics platform to generate a desired computer system and evaluating the computer product on that computer system and further including:
   connecting an external input system to the computer devices;
   providing an external output system that allows connection of the computer product to be evaluated;
   creating a connection with at least one switching multiplexor between the computer devices and the computer product based on a selection;
   creating multiple combinations and configurations of computer processors, operating systems, computer peripherals and computer products to be evaluated of the switching multiplexor with a plurality of switches allowing;
   communicating a controller with the switching multiplexor for providing selection control as to which combination and configuration of computer devices connected to the unified diagnostics platform are selected;
   creating a hardware and a software selector of the controller with a physical control that includes both human intervention and computer control for controlling the selection control; and
   creating a multi-way, multi-function switch that facilitates the multiple connection combinations;
   wherein the desired computer system is generated by connecting a plurality of computer devices to the unified diagnostics platform.

2. The method as set forth in claim 1, wherein the unified diagnostics platform includes at least one switch.

3. The method as set forth in claim 1, wherein the method of:
   connecting the external input system to the computer devices;
   providing the external output system that allows connection of the computer product to be evaluated;
   creating the connection with the at least one switching multiplexor between the computer devices and the computer product based on the selection;
   creating multiple combinations and configurations of computer processors, operating systems, computer peripherals and computer products to be evaluated of the switching multiplexor with the plurality of switches allowing;
   communicating the controller with the switching multiplexor for providing selection control as to which combination and configuration of computer devices connected to the unified diagnostics platform are selected;
   creating the hardware and the software selector of the controller with a physical control that includes both human intervention and computer control for controlling the selection control; and
   creating the multi-way, multi-function switch that facilitates the multiple connection combinations are performed with a computer-readable medium having computer-executable instructions.

4. A method for providing a computer environment in which to evaluate a computer product, comprising:
   configuring the computer environment using a switching device capable of connecting a plurality of computer devices to generate the computer environment;
   evaluating the computer product in the computer environment;
   connecting an external input system to the computer devices;

providing an external output system that allows connection of the computer product to be evaluated;

creating a connection with at least one switching multiplexor between the computer devices and the computer product based on a selection;

creating multiple combinations and configurations of computer processors, operating systems, computer peripherals and computer products to be evaluated of the switching multiplexor with a plurality of switches allowing;

communicating a controller with the switching multiplexor for providing selection control as to which combination and configuration of computer devices connected to the unified diagnostics platform are selected;

creating a hardware and a software selector of the controller with a physical control that includes both human intervention and computer control for controlling the selection control; and creating a multi-way, multi-function switch that facilitates the multiple connection combinations.

5. The method as set forth in claim 4, wherein the switching device is a unified diagnostics platform.

6. The method as set forth in claim 5, where the unified diagnostics platform comprises a switch.

7. The method as set forth in claim 6, wherein the switch is a software switch.

8. An evaluation system for evaluating a computer product, comprising:

a unified diagnostics platform having a plurality of computer devices and the computer product connected thereto, the unified diagnostics platform comprising:

at least one switching multiplexor that allows multiple combinations of connections between the plurality of computer devices and the computer product, wherein the switching multiplexor provides connection between the computer devices and the computer product based on a selection and wherein the multiple combination of the switching multiplexor has allows multiple combinations and configurations of computer processors, operating systems, computer peripherals and computer products to be evaluated and wherein the switching multiplexor contains a multi-way, multi-function switch that facilitates the multiple connection combinations; and a controller in communication with the switching multiplexor that selects at least one of the multiple connection combinations, wherein the controller in communication with the switching multiplexor provides selection control as to which combination and configuration of computer devices connected to the unified diagnostics platform are selected and wherein the controller has a hardware and a software selector with a physical control that includes both human intervention and computer control for controlling the selection control; and an external input system for connecting computer devices;

an external output system that allows connection of the computer product to be evaluated.

9. The evaluation system as set forth in claim 8, wherein a plurality of computer peripherals are connected to the main switch, the secondary switch is connected to a plurality of operating systems, and the computer product comprises a plurality of computer products connected to the main switch and the secondary switch.

10. The evaluation system as set forth in claim 8, wherein the computer product may be at least one of: (a) a communications device; (b) a display device; (c) an input/output device; (d) a user interface device.

11. The evaluation system as set forth in claim 8, wherein at least one of the plurality of computer devices is internal to the unified diagnostics platform.

12. The evaluation system as set forth in claim 8, wherein at least one of the plurality of computer devices is external to the unified diagnostics platform.

13. The evaluation system as set forth in claim 8, wherein at least one of the plurality of computer devices is powered at least in part by a power supply internal to the unified diagnostics platform.

14. The evaluation system as set forth in claim 8, wherein the controller is a software selector.

15. The evaluation system as set forth in claim 8, wherein the controller further comprises a main controller controlling the main switch and a secondary controller controlling the secondary switch.

16. The evaluation system as set forth in claim 15, wherein the controller is a master controller that is used to control the main controller, the secondary controller, the main switch and the secondary switch.

17. The evaluation system as set forth in claim 16, wherein the main controller is software controlled.

* * * * *